United States Patent [19]
Vincent

[11] Patent Number: 5,354,012
[45] Date of Patent: Oct. 11, 1994

[54] BOBBIN FOR ROTATABLE, RELEASABLE ATTACHMENT TO IDENTICAL BOBBINS

[76] Inventor: James D. Vincent, 180 Ridge St., Blackfood, Id. 83221

[21] Appl. No.: 22,484

[22] Filed: Feb. 25, 1993

[51] Int. Cl.$^5$ .................................. B65H 75/18
[52] U.S. Cl. ................................. 242/118.41
[58] Field of Search ............ 242/118.41, 118.4, 118.6, 242/118.61, 118.7, 118.8, 71.8, 167

[56] References Cited

U.S. PATENT DOCUMENTS 2,264,116  11/1941  Howsam ..................... 242/118.4
2,605,980  8/1952   Atwood et al. ............ 242/118.61 X

FOREIGN PATENT DOCUMENTS 571045   2/1959   Canada ........................... 242/118.41
242047  11/1925   United Kingdom ........... 242/118.61

Primary Examiner—Stanley N. Gilreath
Attorney, Agent, or Firm—Charles S. McGuire

[57] ABSTRACT

A bobbin having a drum for winding thereon of filamentary materials such as fishing tackle. The bobbin includes a flat, circular disc having a first surface from which a cylindrical wall extends, and a second surface from which the drum and hub means extend. The wall means of one bobbin mates with the hub means of an identical bobbin with a releasable, interference, snap fit to permit interconnection of a plurality of such bobbins in coaxial, side by side, relatively rotatable relation.

10 Claims, 1 Drawing Sheet

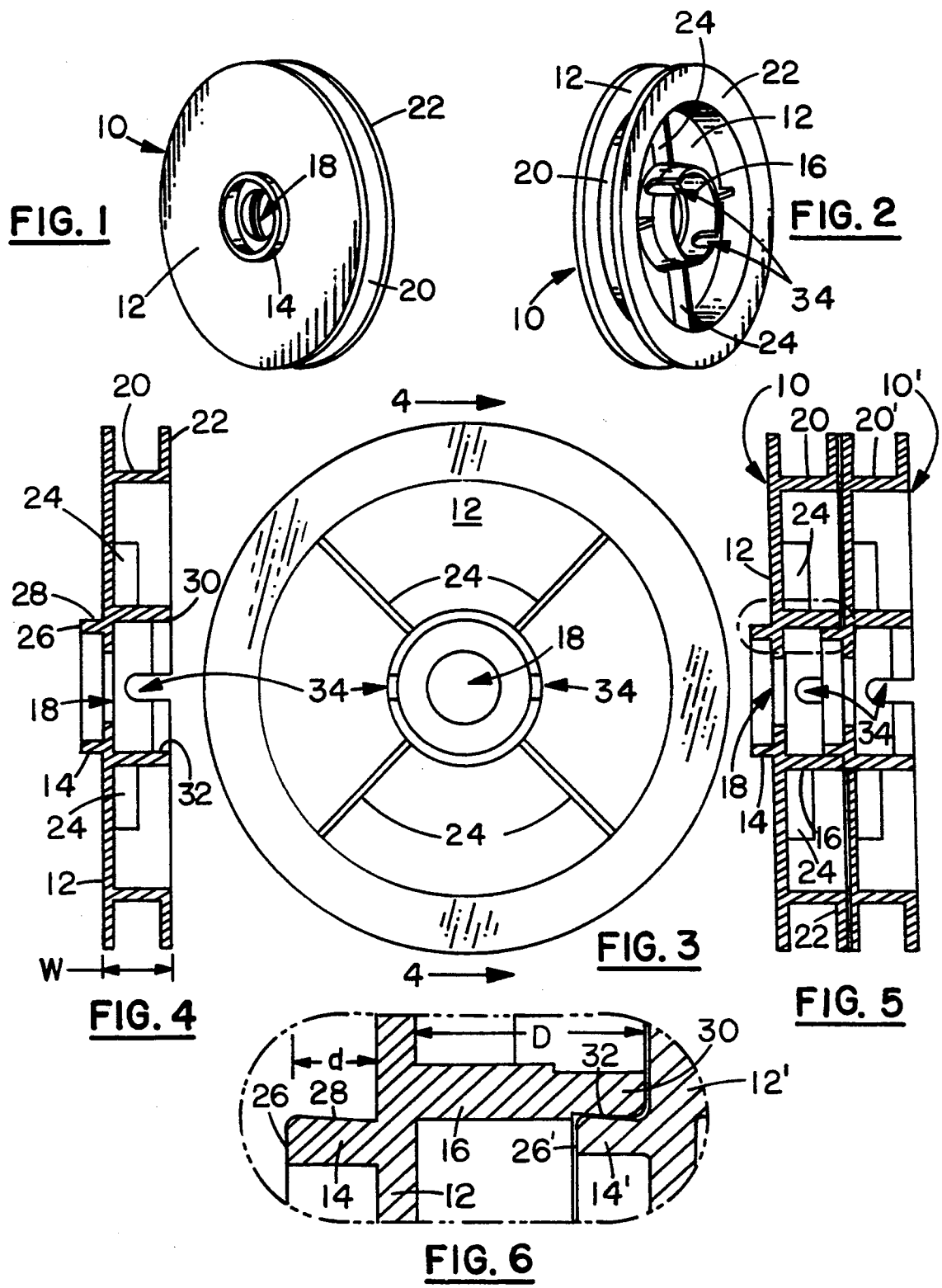

BOBBIN FOR ROTATABLE, RELEASABLE ATTACHMENT TO IDENTICAL BOBBINS

BACKGROUND OF THE INVENTION

The present invention relates to spools or bobbins upon which filamentary materials may be wound and, more specifically, to bobbins which may be detachably secured in coaxial, side-by-side relation with identical bobbins on each side. The invention is of particular utility, and is primarily intended for use, in storing and dispensing filamentary fishing tackle.

It is often desirable for a person working with fishing line, leader, tippet material, etc. to have several sizes or weights of such items available for convenient dispensing in a common location. To this end, a number of winding means have been proposed which involve the coaxial, side-by-side mounting of a plurality of spools or bobbins, each carrying a different size, weight or type of filamentary tackle. Some of these arrangements, such as that of Spencer U.S. Pat. No. 4,998,685, provide a spindle extending through central openings in a plurality of bobbins. Others, such as that of Sweeny U.S. Pat. No. 3,430,886, and with which the present invention is primarily concerned, involve structure on the bobbin itself which cooperatively engages structure on another, identical bobbin to releasably attach two or more of the bobbins in independently rotatable, coaxial, side-by-side relation.

Examination of the Sweeney patent will reveal that the bobbin includes a flexible wall which the user must move between open and closed positions with respect to the cylindrical surface upon which the filament is wound. The wall is in the open position for winding materials onto the bobbin, and in the closed position for mutual attachment of a plurality of bobbins and for dispensing the materials. Besides requiring manual manipulative steps, the useful life of the bobbin is limited by the number of times the wall may be flexed in an "inside out" manner before being damaged.

It is a principal object of the present invention to provide a winding bobbin of novel and improved design including means for releasable interconnection to other, identical bobbins on each side wherein the bobbins require no manual manipulation other than axial movement relative to an identical bobbin.

Another object is to provide a bobbin which may be economically fabricated and is extremely durable.

A further object is to provide a one-piece bobbin for detachable connection to identical bobbins on both sides in coaxial, relatively rotatable relation in a fast, simple and convenient manner.

Other objects will in part be obvious and will in part appear hereinafter.

SUMMARY OF THE INVENTION

The bobbin of the invention comprises a flat, circular disc with a cylindrical wall or hub extending outwardly from each of its opposite surfaces, concentrically about the center. A cylindrical drum, providing a winding surface for the filamentary material, extends from one of the surfaces, concentrically surrounding the other wall on the same surface. The material is wound between the disc and a parallel flange extending from the drum on which the material is wound. The outer surface of the wall on one side of the disc engages the inner surface of the wall on the opposite side of the disc of another, identical bobbin in snap-fit relation to retain the bobbins in releasably attached, coaxial, relatively rotatable relation.

The foregoing and other features of the construction and operation of the invention will be more readily understood and appreciated from the following detailed description, taken in conjunction with the accompanying drawings wherein:

BRIEF DESCRIPTION OF THE DRAWING

FIGS. 1 and 2 are perspective views of the bobbin of the invention, taken from opposite sides;

FIG. 3 is an elevational view of the bobbin, taken from the side seen in FIG. 2;

FIG. 4 is an elevational view in section on the line 4—4 of FIG. 3;

FIG. 5 is an elevational view in section, as in FIG. 4, showing two of the bobbins interconnected; and FIG. 6 is an enlarged, fragmentary view of the portion of FIG. 5 surrounded by the elliptical, phantom line.

DETAILED DESCRIPTION

Referring now to the drawing, the bobbin of the invention, denoted generally by reference numeral 10, includes flat, circular disc 12 having cylindrical wall 14 and hub 16 extending integrally outwardly from opposite sides thereof. Wall 14 and hub 16 concentrically surround central opening 18 in disc 12. Cylindrical drum 20 extends integrally from the same surface of disc 12 as hub 16, concentrically surrounding the latter. Flange 22 extends integrally from drum 20 in spaced, parallel relation to disc 12, whereby filamentary fishing tackle such as leader or tippet material may be wound upon the outer surface of drum 20 and contained between the facing surfaces, flange 22 and the outer portion of disc 12. Ribs 24 are integral along one side with disc 12 and at their inner and outer ends with the outer surface of hub 16 and inner surface of drum 20, respectively, for added rigidity. Bobbin 10 may be conveniently and economically be fabricated as a single piece moulding of suitable plastic material.

Wall 14 extends outwardly from disc 12 for distance d, and is tapered inwardly from its free edge 26 toward disc 12 on its outer surface 28, as best seen in FIG. 6. Bobbin 10 may be releasably attached in coaxial, side-by-side relation to another, identical bobbin on either or both sides. Bobbin 10 is illustrated in FIG. 5 with bobbin 10' attached on the right side thereof. Hub 16 extends outwardly from disc 12 for distance D and has an outer portion extending inwardly from free edge 30 for a distance substantially equal to distance d which is tapered outwardly on its inner surface 32.

The diameter of the outer surface 28 of wall 14 adjacent free edge 26 is a few thousandths of an inch larger than the diameter of the inner surface 32 of hub 16 adjacent free edge 30. Thus, when bobbins 10 and 10' are positioned coaxially and moved toward one another, there is a slight interference at the peripheries of hub 16 and wall 14'. This interference may be overcome by applying manual pressure, pushing bobbins 10 and 10' together, resulting in a snap fit of the outer portion of hub 16 over wall 14', as shown in FIGS. 5 and 6. Although the material of the bobbins is basically rigid, the relatively small interference may be overcome by a slight amount of resilience or flexibility which is aided by axial slots 34 extending inwardly from free edge 30 of hub 16.

When bobbins 10 and 10' are connected in the manner illustrated they are rotatable relative to one another. Moreover, the bobbins may be easily detached from one another by grasping adjacent bobbins at the peripheries of their respective disc and flange portions and pulling them apart. Obviously, additional bobbins could be attached on the left of bobbin 10 and/or the right of bobbin 10' in the positions illustrated in FIG. 5. Thus, the objects of the present invention are achieved in a bobbin structure permitting easy withdrawal of a number of different sizes or weights of filamentary materials from a like number of detachably connected identical bobbins. The filamentary materials may be maintained in a wound condition and conveniently withdrawn from and rewound on the drum by means of an elastic retainer, preferably that of applicant's copending application Ser. No. 08/022,535, filed of even date herewith.

What is claimed is:

1. A bobbin for winding and dispensing filamentary material and adapted for releasable, side-by-side connection to identical bobbins on each side, said bobbin comprising:
    a) a substantially flat disc having a central axis, an outer perimeter and first and second sides;
    b) substantially cylindrical wall means extending outwardly from said disc first side to a first free end and having an outer surface tapering inwardly from a first diameter at said first end toward said disc;
    c) substantially cylindrical hub means extending outwardly from said disc second side to a second free end and having an inner surface tapering inwardly from a second diameter at said second end toward said disc;
    d) drum means extending outwardly from said disc second side in spaced, surrounding relation to said hub means, said drum means having a substantially cylindrical, outer surface inwardly of said disc outer perimeter upon which said filamentary material may be wound; and
    e) said second diameter being slightly smaller than said first diameter to provide snap-fit engagement means on said wall means of a first bobbin and said hub means of a second, identical bobbin for releasable engagement upon axial movement of said first bobbin with said second bobbin coaxially aligned therewith and said first side of said disc of said first bobbin facing said second side of said disc of said second bobbin.

2. The bobbin of claim 1 wherein said first free end lies in a plane parallel to and spaced a first distance from said disc first side, and said second free end lies in a plane parallel to and spaced a second distance from said disc second side.

3. The bobbin of claim 2 wherein said second distance is greater than said first distance and said wall means of said bobbin extends into said hub means of said identical bobbin when the two bobbins are in said releasable engagement.

4. The bobbin of claim 1 and further including a flange member extending from said drum outer surface in spaced, parallel relation to the portion of said disc outwardly of said cylindrical surface.

5. The bobbin of claim 4 wherein said drum includes a substantially cylindrical, inner surface, and said bobbin further includes a plurality of reinforcing ribs extending radially between said hub means and said drum inner surface.

6. The bobbin of claim 5 wherein said bobbin is formed as a single, molded plastic piece, said ribs being integral along one side with said disc and at opposite ends with said hub means and said drum inner surface, respectively.

7. The bobbin of claim 1 wherein said second diameter is a few thousandths of an inch smaller than said first diameter.

8. The bobbin of claim 7 wherein said bobbin is formed as a single piece of molded, substantially rigid plastic.

9. The bobbin of claim 8 wherein both of said wall means and said hub means each have substantially cylindrical inner and outer surfaces.

10. The bobbin of claim 9 wherein at least one of said wall and hub means includes at least one axial slot to provide limited resilience for said snap fit.

* * * * *